United States Patent
Stentz

[19]

[11] Patent Number: 6,147,794
[45] Date of Patent: Nov. 14, 2000

[54] RAMAN AMPLIFIER WITH PUMP SOURCE FOR IMPROVED PERFORMANCE

[75] Inventor: Andrew John Stentz, Clinton, N.J.

[73] Assignee: Lucent Technologies, Inc., Murray Hill, N.J.

[21] Appl. No.: 09/244,214

[22] Filed: Feb. 4, 1999

[51] Int. Cl.[7] .............. G02B 6/28; G02B 6/36; H01S 3/30

[52] U.S. Cl. .......... 359/334; 359/124; 359/134; 359/160; 372/3; 372/70

[58] Field of Search ................ 359/122, 124, 359/134, 160, 327, 334, 337, 341; 372/3, 70

[56] References Cited

U.S. PATENT DOCUMENTS

| | | | |
|---|---|---|---|
| 4,616,898 | 10/1986 | Hicks | 359/327 |
| 4,805,977 | 2/1989 | Tamura et al. | 359/327 |
| 4,881,790 | 11/1989 | Mollenauer | 359/334 |
| 5,191,628 | 3/1993 | Byron | 385/27 |
| 5,623,508 | 4/1997 | Grubb et al. | 359/327 |
| 5,815,518 | 9/1998 | Reed et al. | 359/124 |

OTHER PUBLICATIONS

Stentz, AJ, Conf. Opt. Fiber Commun. Tech. Digest, vol. 6, pp 343; abstract only herewith, Feb. 21, 1997.
Masuda et al, BCOC 97, Conf. Public. #448, pp 73–76, Sep. 1997.
Stentz et al, OFC '96, vol. 92, pp 16–17, Mar. 1, 1996.

*Primary Examiner*—Nelson Moskowitz

[57] ABSTRACT

In accordance with the invention, a first order Raman amplifier comprises a low power first order Raman pump followed by one or more components that are lossy or unreliable at high power levels. After passing through the component, the first order pump is itself amplified by a second order Raman amplifier. The amplified first order pump is then used to amplify optical signals in a transmission fiber. Advantages are that resulting pump source is more reliable and relatively insensitive to insertion loss. Convenient low power sources, such as filtered spontaneous emission sources can be used as the first order pump source. And the gain spectrum of the second order pump can be used to compensate the gain spectrum of the first order pump.

9 Claims, 2 Drawing Sheets

RAMAN AMPLIFIER WITH PUMP SOURCE FOR IMPROVED PERFORMANCE

FIELD OF THE INVENTION

This invention relates to Raman optical amplifiers and, in particular, to Raman amplifiers with a pump source for providing improved amplifier performance.

BACKGROUND OF THE INVENTION

Raman optical amplifiers are important components in optical communication systems. Optical fiber communication systems are beginning to achieve their great potential for the rapid transmission of vast amounts of information. In essence, an optical fiber system comprises a source of information-carrying optical signals, an optical fiber transmission line for carrying the optical signals and a receiver for detecting the optical signals and demodulating the information they carry. The signals are typically within a wavelength range favorable for propagation within silica fibers, and preferably comprise a plurality of wavelength distinct channels within that range.

Despite significant progress in reducing the attenuation characteristics of optical fibers, signals transmitted through them are attenuated by the cumulative and combined effect of absorption and scattering. Consequently long distance transmission requires periodic amplification.

One approach to optical amplification utilizes Raman effect amplification. In the Raman effect amplification, light traveling within a medium is amplified by the presence of lower wavelength pump light traveling within the same medium. The gain spectrum of a silica fiber pumped by a monochromatic Raman pump exhibits maximum gain when the signal to be amplified is at a frequency approximately 13 THz lower than the frequency of the Raman pump. The frequency (or wavelength) difference between the pump and the frequency (or wavelength) of maximum gain is often referred to as the Stokes shift, and the amplified signal is referred to as the Stokes wave. Use of a pump that is detuned from the signals by about one Stokes shift (½ the Stokes shift to 3/2 the shift) is referred to as first-order Stokes pumping.

It has also been observed that the gain is significantly larger for a co-polarized signal and pump. This polarization sensitivity can be eliminated if the pump is depolarized, polarization-scrambled or composed of two equally powerful polarized pumps that are polarization multiplexed. See, for example, U.S. Pat. No. 4,805,977, issued to Y. Tamura et al and entitled "Optical Coupler for Optical Direct Amplifier".

Raman amplifiers can be categorized as either distributed or discrete. In distributed amplifiers, the transmission fiber itself is used as the gain medium. In discrete amplifiers, a separate fiber, typically optimized for Raman amplification, is used as the gain fiber. While the discrete amplifier gain fiber may be kilometers in length it is typically spooled at one location and not used to transfer information from one location to another. The term "Raman amplifier", as used herein, refers to both the pump and the gain medium.

Signal amplification utilizing distributed first order Raman effect amplifiers is described in U.S. Pat. No. 4,616,898 issued to John W. Hicks, Jr. on Oct. 14, 1986. The Hicks et al. system disposes a plurality of optical Raman pumps at spaced intervals along the transmission line. These pumps inject pump light into the optical fiber at a wavelength shorter than the signal wavelengths by a Stokes shift, so that the pump light amplifies the lower wavelength signals by the first order Raman effect.

A difficulty with conventional Raman amplifiers is that they are typically critically dependent on power sensitive components subsequent (downstream) to the pump. Often Raman pump sources utilize a plurality of sources to establish a high power first order pump (>100 mW) and an immediate downstream multiplexing component to combine the outputs into a pump with a wide, flat bandwidth. In typical amplifiers, the pump power is generated by an array of high power semiconductor pump lasers that are followed by wavelength-division multiplexers. See, for example, Y. Emori et al., "Less than 4.7 dB Noise Figure . . . ", Conference on Optical Amplifiers, Paper PD3-1, Vail Colorado (Jul. 27–29, 1998). The problem with such amplifiers is that the multiplexers present relatively high insertion loss to the high power signals. Moreover the multiplexers are not reliable at high power levels. Other Raman pump sources utilize plural sources of different polarization followed by polarization multiplexers. The polarization multiplexers present the same problems of insertion loss and unreliability at high power. And even single source high power pumps are sometimes followed by lossy or unreliable components as polarization scramblers or spectral filters. Accordingly there is a need for an improved Raman amplifier with reduced sensitivity to power sensitive components.

SUMMARY OF THE INVENTION

In accordance with the invention, a first order Raman amplifier comprises a low power first order Raman pump followed by one or more components that are lossy or unreliable at high power levels. After passing through the component, the first order pump is itself amplified by a second order Raman amplifier. The amplified first order pump is then used to amplify optical signals in a transmission fiber. Advantages are that resulting pump source is more reliable and relatively insensitive to insertion loss. Convenient low power sources, such as filtered spontaneous emission sources can be used as the first order pump source. And the gain spectrum of the second order pump can be used to compensate the gain spectrum of the first order pump.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
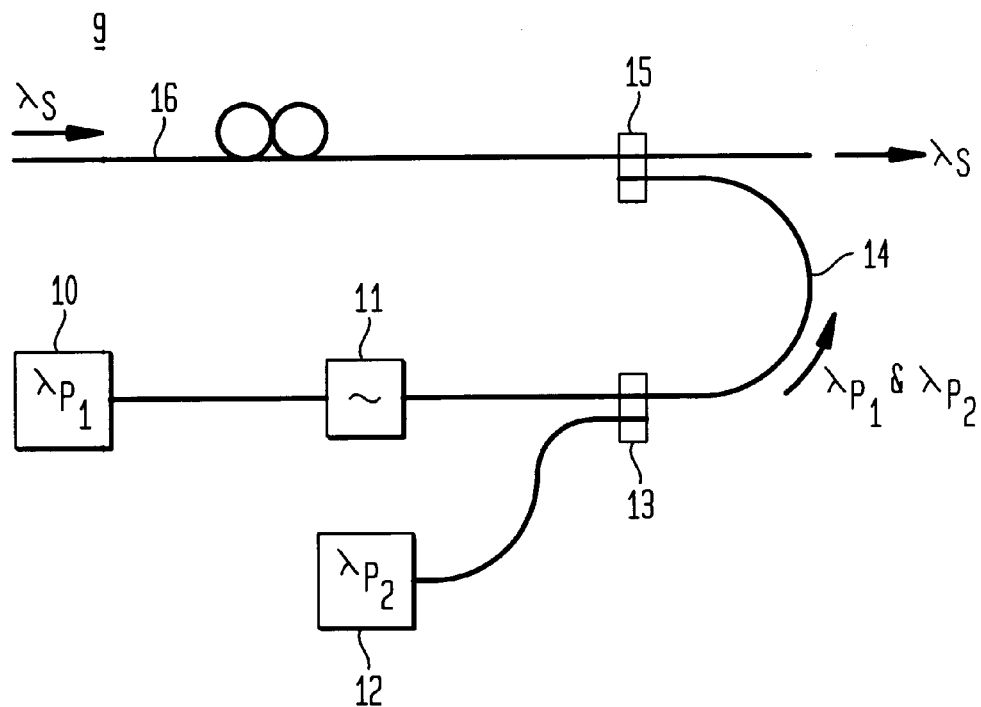
FIG. 1 schematically illustrates a first embodiment of a Raman amplifier using distributed second order amplification of a first order pump.

Referring to the drawings, FIG. 1 illustrates a distributed Raman amplifier 9 comprising a low power first order pump source 10 whose output is connected to one or more power sensitive components 11. By power sensitive component is meant a component incurring a greater than 10% insertion loss or a component subject to a high failure rate at optical power of 100 mW. A high failure rate can be quantified as a FIT rate greater than 1000 where the FIT rate is the expected number of failures in $10^9$ hours.

The first order pump source 10 can comprise a plurality of sources which differ in wavelength or polarization. The combined first order pump $\lambda_{p1}$ is then itself amplified by a second order Raman amplifier comprising, for example, a second order pump source 12, subsequent fiber segment 14 and a portion of transmission line 16. The second order pump from source 12 is added to the first order pump $\lambda_{p1}$ at coupler 13, and the first and second order pumps $\lambda p_1$ and $\lambda p_2$ travel together along a length of fiber 14 and a portion of fiber 16 to permit Raman amplification of $\lambda p_1$. Coupler 15 launches $\lambda_{p1}$ and $\lambda_{p2}$ into the transmission fiber 16 counterpropagating with a transmitted signal $\lambda_s$ in the transmission fiber.

The low power first order pump source 10 preferably has a low power level less than 100 mW. It can comprise a plurality of sources such as an array of semiconductor lasers or it can be a single source such as a filtered spontaneous emission source.

The power sensitive component 11, can be a polarization or wavelength-division multiplexer, a polarization scrambler, or a spectral filter (for a spontaneous emission source). It typically has a loss of 10% or more or a FIT rate greater than 1000 when subjected to an optical input of 100 mW.

The second order pump source 12 is preferably a high power semiconductor laser.

Figure 2:
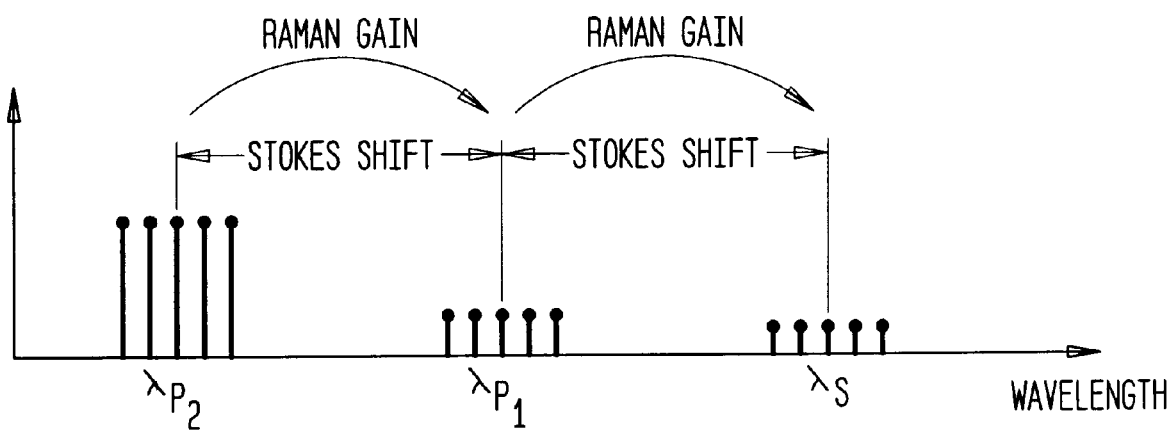
FIG. 2 is a schematic spectral diagram showing the relationship among the wavelengths for the amplifier of FIG. 1.

FIG. 2 is a qualitative power spectrum illustrating the spectral relationship among $\lambda p_1$, $\mu p_2$ and $\lambda_s$. In essence, $\lambda p_1$ is one Stokes shift shorter in wavelength than $\lambda_s$ so that $\lambda p_1$ amplifies $\lambda_s$. And $\lambda p_2$ is one Stokes shift shorter than $\lambda p_1$ so that $\lambda p_2$ amplifies $\lambda p_1$.

Figure 3:
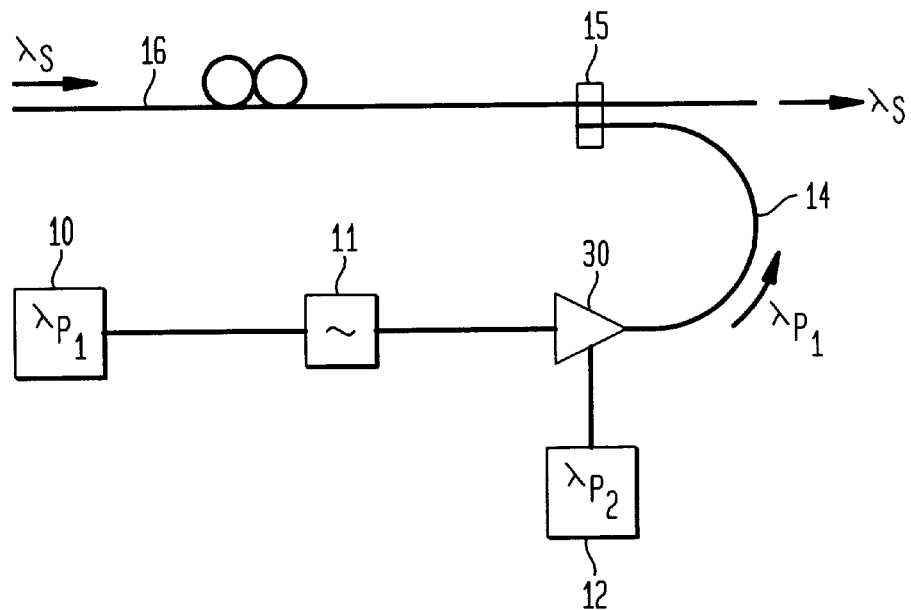
FIGS. 3 and 4 schematically illustrate Raman amplifiers using discrete second order amplification of a first order pump.

FIG. 3 illustrates an alternative embodiment similar to that of FIG. 2 wherein the second order pump amplifies the combined first order pump in a discrete Raman gain fiber 30 before the amplified $\lambda p_1$ is introduced into the transmission line 16 for distributed amplification of $\lambda_s$. The gain fiber 30 is essentially one or more coils of fiber where $\lambda_{p1}$ and $\lambda_{p2}$ propagate together. The source 12 and the gain fiber 30 form a discrete second order Raman amplifier.

Figure 4:
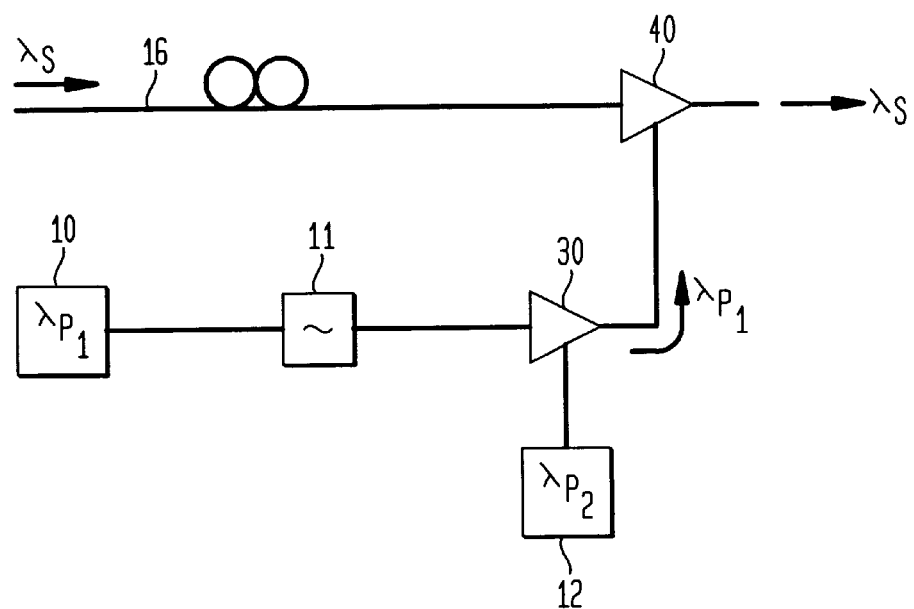

FIG. 4 illustrates a second alternative embodiment similar to that of FIG. 3 except that the amplified first order pump $\lambda_1$ amplifies $\lambda_s$ in a second discrete Raman gain fiber 40.

It is to be understood that the above-described embodiments are illustrative of only a few of the many possible specific embodiments which can represent applications of the principles of the invention. Numerous and varied other arrangements can be in accordance with these principles without departing from the spirit and scope of the invention.

What is claimed is:

1. A Raman optical amplifier for amplifying optical signals propagating in a transmission fiber comprising:
    a pump optical waveguide path for optically coupling to the transmission fiber;
    a first order Raman pump source optically coupled to the pump path for injecting into the path pump light for first order Raman amplification of the optical signals;
    a power sensitive component having an insertion loss of at least 10% or a FIT rate greater than 1000 for an optical power of 100 mW, the power sensitive component disposed in the pump path for receiving the output of the first order pump source;
    a second order Raman pump source for amplifying the first order pump light; and
    an optical coupler for injecting pump light from the second order pump into the pump path, the coupler disposed in the pump path downstream from both the first order pump source and the power sensitive component for amplifying the first order pump light after it exits the power sensitive component.

2. The amplifier of claim 1 wherein said first order pump source comprises a plurality of different wavelength sources and said power sensitive component comprises a wavelength division multiplexer.

3. The amplifier of claim 1 wherein said first order pump source comprises a plurality of different polarization sources and said power sensitive component comprises a polarization multiplexer.

4. The amplifier of claim 1 wherein the amplified first order pump is launched into said transmission fiber for amplifying said optical signals by distributed Raman amplification.

5. The amplifier of claim 1 wherein the amplified first order pump is introduced into a gain fiber for amplifying said optical signals by discrete Raman amplification.

6. The amplifier of claim 1 wherein said first order pump source is a low power pump source having a power level of less than 100 mW.

7. The amplifier of claim 1 wherein said first order pump source comprises a spontaneous emission source.

8. The amplifier of claim 1 wherein said power sensitive component comprises a polarization scrambler.

9. The amplifier of claim 1 wherein said power sensitive component comprises a spectral filter.

* * * * *